(12) United States Patent
Swix et al.

(10) Patent No.: US 7,086,075 B2
(45) Date of Patent: Aug. 1, 2006

(54) METHOD AND SYSTEM FOR MANAGING TIMED RESPONSES TO A/V EVENTS IN TELEVISION PROGRAMMING

(75) Inventors: Scott R. Swix, Duluth, GA (US); William R. Matz, Atlanta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 277 days.

(21) Appl. No.: 10/036,677

(22) Filed: Dec. 21, 2001

(65) Prior Publication Data
US 2004/0163103 A1 Aug. 19, 2004

(51) Int. Cl.
*H04H 9/00* (2006.01)
*H04N 7/16* (2006.01)

(52) U.S. Cl. .............................. 725/10; 725/12; 725/14; 725/32; 725/87

(58) Field of Classification Search ..................... 725/9, 725/10, 12, 13, 14, 20, 23, 32, 36, 42, 98, 725/99, 110, 118, 134, 87, 135; 705/10, 14; 386/35, 46, 68, 83, 95, 125; 348/734
See application file for complete search history.

(56) References Cited

U.S. PATENT DOCUMENTS

| | | | |
|---|---|---|---|
| 3,798,610 A | 3/1974 | Bilaa et al. | |
| 3,886,302 A | 5/1975 | Kosco | |
| 4,130,833 A | 12/1978 | Chomet | |
| 4,258,386 A | 3/1981 | Cheung | |
| 4,361,851 A | 11/1982 | Asip et al. | |
| 4,488,179 A | 12/1984 | Kruger | |
| 4,566,030 A | 1/1986 | Nickerson et al. | |
| 4,567,591 A | 1/1986 | Gray et al. | |
| 4,598,288 A | 7/1986 | Yarbrough et al. | |
| 4,602,279 A | 7/1986 | Freeman | |
| 4,688,248 A | 8/1987 | Tomizawa | |
| 4,689,661 A | 8/1987 | Barbieri et al. | |
| 4,697,209 A | 9/1987 | Kiewit et al. | |
| 4,698,670 A | 10/1987 | Matty | |
| 4,720,873 A | 1/1988 | Goodman et al. | |
| 4,816,904 A | 3/1989 | McKenna et al. | |

(Continued)

FOREIGN PATENT DOCUMENTS

| EP | 0 424 648 A | 2/1991 |
|---|---|---|
| EP | 1162840 A2 | 12/2001 |
| WO | WO 99 04561 A | 1/1999 |
| WO | WO 99 45702 A | 9/1999 |
| WO | WO 99 52285 A | 10/1999 |

OTHER PUBLICATIONS

PCT Publication No. WO 94/17809 (Klefi et al., Aug. 4, 1994).

Cauley, Leslie, "Microsoft, Baby Bell Form Video Alliance," *The Wall Street Journal.* Sep. 26, 1994.

(Continued)

*Primary Examiner*—Krista Bui
(74) *Attorney, Agent, or Firm*—Bambi F. Walters, Esq.; Walters and Zimmerman

(57) ABSTRACT

A method for providing an incentive for a viewer to watch and react to audio/video programming. The method includes prompting the viewer during a television programming stream to provide an indicated response to an event within an indicated time period, detecting the indicated response to the event, measuring a response time of the indicated response to the event, evaluating viewer performance based upon the response time, and providing the incentive to the viewer based upon the response time. The method involves a viewer actuating a pushbutton key of a set-top box remote control unit and transmitting and recording the response via the set-top box. A media delivery device for providing incentives, rewards, discounts, marketing data, and measurements to a viewer and a media delivery network.

20 Claims, 3 Drawing Sheets

U.S. PATENT DOCUMENTS

| | | |
|---|---|---|
| 4,890,322 A | 12/1989 | Russell, Jr. |
| 4,912,552 A | 3/1990 | Allison, III et al. |
| 5,010,585 A | 4/1991 | Garcia |
| 677,209 A | 6/1991 | Chernock et al. |
| 5,038,211 A | 8/1991 | Hallenbeck |
| 5,046,090 A | 9/1991 | Walker et al. |
| 5,046,092 A | 9/1991 | Walker et al. |
| 5,055,924 A | 10/1991 | Skutta |
| 5,173,900 A | 12/1992 | Miller et al. |
| 5,191,645 A | 3/1993 | Carlucci et al. |
| 5,208,665 A | 5/1993 | McCalley et al. |
| 5,247,347 A | 9/1993 | Litteral et al. |
| 5,249,044 A | 9/1993 | VonKohorn |
| 5,251,324 A | 10/1993 | McMullan |
| 5,287,181 A | 2/1994 | Holman |
| 5,335,277 A | 8/1994 | Harvey et al. |
| 5,339,315 A | 8/1994 | Maeda et al. |
| 5,343,240 A | 8/1994 | Yu |
| 5,357,276 A | 10/1994 | Banker et al. |
| 5,374,951 A | 12/1994 | Welsh |
| 5,389,964 A | 2/1995 | Oberle |
| 5,404,393 A | 4/1995 | Remillard |
| 5,410,326 A * | 4/1995 | Goldstein |
| 5,410,344 A | 4/1995 | Graves |
| 5,446,490 A | 8/1995 | Blahut et al. |
| 5,446,919 A | 8/1995 | Wilkins |
| 5,500,681 A * | 3/1996 | Jones |
| 5,534,911 A | 7/1996 | Levitan |
| 5,559,548 A | 9/1996 | Davis |
| 5,585,838 A | 12/1996 | Lawler et al. |
| 5,585,865 A | 12/1996 | Amano |
| 5,600,364 A | 2/1997 | Hendricks |
| 5,608,448 A | 3/1997 | Smoral et al. |
| 5,619,247 A | 4/1997 | Russo |
| 5,630,119 A | 5/1997 | Aristides |
| 5,661,516 A | 8/1997 | Carles |
| 5,724,521 A | 3/1998 | Dedrick |
| 5,724,525 A | 3/1998 | Beyers, II et al. |
| 5,752,159 A | 5/1998 | Faust et al. |
| 5,754,939 A | 5/1998 | Herz et al. |
| 5,758,257 A * | 5/1998 | Herz et al. |
| 5,758,259 A | 5/1998 | Lawler |
| 5,774,170 A | 6/1998 | Hile et al. |
| 5,778,182 A | 7/1998 | Cathey et al. |
| 5,794,210 A | 8/1998 | Goldhaber et al. |
| 5,818,438 A | 10/1998 | Howe et al. |
| 5,838,314 A | 11/1998 | Neel |
| 5,848,396 A | 12/1998 | Gerace |
| 5,861,906 A | 1/1999 | Dunn |
| 5,892,508 A | 4/1999 | Howe et al. |
| 5,892,536 A | 4/1999 | Logan |
| 5,917,481 A | 6/1999 | Rzeszewski |
| 5,948,061 A | 9/1999 | Merriman et al. |
| 5,973,683 A | 10/1999 | Cragun |
| 5,983,227 A | 11/1999 | Nazem |
| 6,002,393 A | 12/1999 | Hite |
| 6,005,597 A | 12/1999 | Barrett |
| 6,015,344 A | 1/2000 | Kelly et al. |
| 6,029,045 A | 2/2000 | Picco et al. |
| 6,076,094 A | 6/2000 | Cohen et al. |
| 6,100,916 A | 8/2000 | August |
| 6,119,098 A | 9/2000 | Guyot et al. |
| 6,134,531 A * | 10/2000 | Trewitt et al. |
| 6,172,674 B1 | 1/2001 | Etheredge |
| 6,185,614 B1 | 2/2001 | Cuomo |
| 6,202,210 B1 | 3/2001 | Ludtke |
| 6,252,586 B1 | 6/2001 | Freeman et al. |
| 6,282,713 B1 | 8/2001 | Kitsukawa |
| 6,314,568 B1 | 11/2001 | Ochiai |
| 6,314,577 B1 | 11/2001 | Pocock |
| 6,327,574 B1 | 12/2001 | Kramer et al. |
| 6,345,256 B1 | 2/2002 | Milsted et al. |
| 6,434,747 B1 | 8/2002 | Khoo et al. |
| 6,446,261 B1 * | 9/2002 | Rosser |
| 6,457,010 B1 | 9/2002 | Eldering |
| 6,463,468 B1 | 10/2002 | Buch |
| 6,463,585 B1 | 10/2002 | Hendricks et al. |
| 6,477,704 B1 | 11/2002 | Cremia |
| 6,487,538 B1 | 11/2002 | Gupta et al. |
| 6,496,818 B1 | 12/2002 | Ponte |
| 6,505,348 B1 | 1/2003 | Knowles |
| 6,507,839 B1 | 1/2003 | Ponte |
| 6,510,417 B1 | 1/2003 | Woods et al. |
| 6,530,082 B1 * | 3/2003 | Del Sesto et al. |
| 6,631,360 B1 | 10/2003 | Cook |
| 6,714,992 B1 | 3/2004 | Kanojia et al. |
| 6,718,551 B1 | 4/2004 | Swix et al. |
| 6,845,398 B1 | 1/2005 | Kanojia et al. |
| 6,850,988 B1 | 2/2005 | Reed |
| 2002/0032906 A1 * | 3/2002 | Grossman |
| 2002/0035600 A1 * | 3/2002 | Ullman et al. |
| 2002/0049967 A1 * | 4/2002 | Haseltine et al. |
| 2002/0092019 A1 | 7/2002 | Dwight |
| 2002/0123928 A1 | 9/2002 | Eldering et al. |
| 2002/0143647 A1 | 10/2002 | Headings et al. |
| 2002/0199197 A1 | 12/2002 | Winter |
| 2003/0049987 A1 | 3/2003 | Kinzo et al. |
| 2003/0067554 A1 | 4/2003 | Klarfield |
| 2003/0110497 A1 * | 6/2003 | Yassin et al. |

OTHER PUBLICATIONS

International Search Report for PCT /US02/40070 A1.

"allNetDevices:—Report: Interactive TV Soon to Become Direct Marketing Tool," allNetDevices, www.devices.Internet.com/com_ogl/print/print.ogl?url=http://devices. . . /report_interactive.html. (Nov. 16, 2001) pp. 1–2.

"Liberate Technologies—Solutions," Digital Cable Two–Way, www.solutions.liberate.com/architecture/dc2.html. (Nov. 16, 2001) p. 1 of 1.

"Liberate Technologies—Solutions," Digital Broadband Telco, www.solutions.liberate.com/architecture/db.html, (Nov. 16, 2001) p. 1 of 1.

"Liberate Technologies—Solutions," Liberate Connect Suite, www.solutions.liberate.com/products/connect_suite.html. (Nov. 16, 2001) pp. 1–2.

"Liberate Technologies—Solutions," Liberate Imprint Server, ™, www.solutions.liberate.com/products/imprint_server.html, (Nov. 16, 2001) p. 1 of 1.

"Liberate Technologies—Solutions," Liberate Medicast Server™, www.solutions.liberate.com/products/mediacast_server.html, (Nov. 16, 2001) pp. 1–2.

"Spike High Performance Server Array," Mixed Signals Technologies, Inc., www.mixedsignals.com, lty@mixedsignals.com (2000) p. 1.

"power, flexibility, and control," RespondTV, www.respondtv.com/inaction.html (Nov. 16, 2001) pp. 1–2.

"R clickal," RespondTV, www.respondtv.com/inaction.html, (Nov. 16, 2001) pp. 1–2.

"The Wink System," Wink System Diagram, www.wink.com/contents/tech_diagram.html, (Nov. 16, 2001) p. 1 of 1.

"What Is Wink?," www.wink.com/contents/whatiswink.html, (Nov. 16, 2001) p. 1 of 1.

"How Wink Works," What is Wink; How wink works, www.wink.com/contents/howitworks.html, (Nov. 16, 2001) p. 1 of 1.

www.actv.com, Screen Print, Oct. 8, 2000.

"ACTV, Inc. Offers Exclusive Preview of 'Individualized Television' at Official All–Star Cafe," Business Wire, Sep. 16, 1998.

"ACTV's HyperTV & 'Individualized Television' to be Powered by Sun Microsystems' JavaTV Technology," Business Wire, Apr. 21, 1999.

Whitaker, Jerry, "Interactive TV: Killer Ap or Technical Curiosity?", Broadcast Engineering, Dec. 1999.

Dickson, Glen, "Digital TV gets specifically directed," Broadcasting & Cable, Jun. 5, 2000.

Reed, David, "The future is digital," Precision Marketing, v. 13, n.51, p. 27, Sep. 21, 2001.

U.S. Appl. No. 09/496,825, filed Feb. 1, 2000, inventor Grauch.

U.S. Appl. No. 09/799,306, filed Jan. 6, 1997, inventor Grauch.

U.S. Appl. No. 10/016,988, filed Dec. 14, 2001, inventor Matz.

U.S. Appl. No. 10,017, 111, filed Dec. 14, 2001, inventor Matz.

U.S. Appl. No. 10/017,630, filed Dec. 14, 2001, inventor Swix.

U. S. Appl. No. 10/017,640, filed Dec. 14, 2001, inventor Matz.

U.S. Appl. No. 10/017,742, filed Dec. 14, 2001, inventor Matz.

U.S. Appl. No. 10,036,923, filed Dec. 21, 2001, inventor Swix.

U.S. Appl. No. 10/037,005, filed Dec. 21, 2001, inventor Matz.

U.S. Appl. No. 10/778,345, filed Feb. 17, 2004, inventor Swix.

* cited by examiner

METHOD AND SYSTEM FOR MANAGING TIMED RESPONSES TO A/V EVENTS IN TELEVISION PROGRAMMING

CROSS-REFERENCE TO RELATED APPLICATIONS

This application relates to U.S. application Ser. No. 09/861,595 entitled "Method and Apparatus for Providing Incentives for Viewers to Watch Commercial Advertisements" by Meadows et al., filed May 22, 2001, and U.S. application Ser. No. 09/496,825, filed Feb. 1, 2000, which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

FIELD OF THE INVENTION

The present invention relates generally to the field of managing television viewing activities. More specifically, the present invention relates to advertising management systems and methods in which timed responses to audio/video (A/V) events in television programming are presented, responded to, and tracked.

BACKGROUND OF THE INVENTION

Advertisements and content may be displayed in between and during the subject portions of television programming. Advertisements are the primary source of revenue for television networks and a major component in the generation of revenue for advertisers. In one example, advertisements are typically ten to ninety seconds in length, and are grouped together as pre-selected breaks in the broadcast of a program, typically occurring from every few to every fifteen minutes of programming. In another example, advertising may be accomplished by subtly placing products within the subject portion of a broadcast, such as during movies, sitcoms, sporting events, etc. The number of advertisements and the timing between the placement of the advertisements is dependent on the type of program and the format of the program (e.g., live or pre-recorded). Television programming typically includes approximately sixteen minutes of advertisements during every hour of programming, providing a large amount of time to present information to consumers. Many advertisers use this time as their primary avenue for promoting products, content, services, and events to consumers.

Television advertising and content is generally more effective when aired during popular television programs that are watched by many viewers who are interested in the types of products or services being advertised. "Targeted advertising" refers to identifying a group of people as being those that have the greatest interest in what is being advertised, and providing the most favorable situation in which the advertisement will reach that pre-determined group of consumers. Advertisers reach these predetermined groups by strategically placing advertisements and content based on the time of the day, the popularity of a subject program, and the type of advertisement or content shown. Displaying an advertisement to a large audience results in more potential consumers receiving the advertisement, which is likely to result in more revenue being generated. In determining whether a television program may be appropriate for a particular advertisement, advertisers consider viewer categories such as age, gender, income level, and viewer interests.

Broadcasting networks and advertisers are able to gauge which demographic groups are watching which programs using conventional market research tools. For example, the AC Nielsen™ ratings system tracks television viewing activities by sampling a plurality of households, and estimating the number of viewers of particular programs using the viewing activity data.

To gauge the effectiveness of their spending, advertisers have long sought information related to potential consumer viewing patterns. There are several conventional devices and techniques that exist for gathering such information. For example, U.S. Pat. No. 4,258,386 issued to Cheung discloses "an apparatus for television audience analysis comprising means for monitoring a television receiver, means responsive to a monitored signal for storing information representative of channel identification and of the time at which a channel is selected and at which the selection of a channel is terminated, and means for reading the stored information periodically."

As another example, U.S. Pat. No. 4,556,030 issued to Nickerson, et al., discloses "a data storage and transmission system for accumulating and transmitting data from a plurality of remote T.V. panelist locations to a central location. Each remote unit includes a microprocessor, a control memory, and a data store memory. The control memory stores control information for the remote unit, which may include dynamic allocation information. The data store memory is event driven and stores data as to television channel selection and times thereof, and can store viewer reaction data and the like. At a pre-selected time, each remote unit initiates a telephone call to a central location and identifies itself. Upon successful telephone connection between a remote unit and the central location, any data such as viewer habit and/or reaction data and the like contained in the data store memory is transmitted over the telephone line to the central location."

Other conventional systems and methods provide somewhat more use data than only channel numbers viewed and the time of viewing, such as which products panelists purchase. U.S. Pat. No. 4,816,904 issued to McKenna, et al., discloses "a data gathering system including a plurality of remote units which are controlled from a central location. Each of the remote units are attached to a television receiver which is generally, but not necessarily, attached to a cable system. Each of the remote units may function to determine which of several TV modes is in use as well as to store TV channel selector data, data from an optical input device, and/or data input by viewers representative of the composition of the viewing audience. The data is stored for either later collection by a portable data collector, or for direct transmission via telephone to the central location. A video message for a TV viewer, such as a survey, may be transmitted from the central location and stored at the remote units, for later display on the TV receiver associated with the remote units. The substitution of alternate programming information may also be achieved by the central control point on selected of the remote units."

Conventionally, panelist monitoring may be used to gauge the effectiveness of advertising and content on a selected group of panelists. Nevertheless, while panelist monitoring systems like those described above provide somewhat more monitoring data than just TV tuning data, they do so only for limited groups. For example, when more data is gathered (like purchase information), it is done only for the panelist groups, rather than for subscribers of the entire system.

Conventional systems typically capture ratings information that identifies which television shows are viewed, rather than whether the subscriber also viewed the commercials displayed during those shows. What is important to an advertiser is that potential consumers are interested in an advertisement enough to sit through its duration. There is a great deal of money invested in advertising, with the hopes that it will return even greater profits. Conventional systems do not result in adequate amounts of viewing information and feedback being generated, and are not efficient in presenting the information to and rewarding viewers for participating in television programming.

Accordingly, there is a need for gathering more detailed viewer information, establishing two-way communication with a viewer in order to collect the detailed information, and systems and methods for processing the detailed information in order to accomplish the goals of both a viewer and a provider, such as requesting certain types of information and receiving information and incentives based upon viewer participation.

BRIEF SUMMARY OF THE INVENTION

In the preferred embodiment, the present invention provides highly efficient systems and methods whereby audio/visual cues or events are presented to viewers of a television program, advertisement, or other content. The systems and methods include recording response times to the audio/visual cues or events provided by the viewer by actuating a key on a user input device, such as a remote control unit. Viewer response times are then processed and evaluated for the purposes of competition, discounts, incentives, awards, and other purposes.

The present invention provides for the presentation to a viewer to be made using standard or time-tag enhanced television programming and any conventional set top box equipped with demographics and programming collection and analysis systems that may be deployed for use on an interactive media delivery system.

In one embodiment, the present invention builds upon the ability of a set top box processor to record the actions of a viewer while watching television. By actuating a key on a remote control unit based upon audio/visual cues, viewer behavior may be recorded, transmitted if necessary, and then processed in order to evaluate the viewer behavior. Since each viewer action is time-stamped, a recreation of the viewer action sequence in time may be generated, which may be compared against any known sequence of events.

In the preferred embodiment, a television programming stream (network show, advertisement, etc.) presented over a particular period of time may include one or more intentional or incidental occurrences of audio/video content or events, such as the display of products, a word, a sound, an action by an actor, an effect, or any other recognizable event. Responses to these cues may be used as part of an award, incentive, measurement, market test, individual skill (including visual) measurement, marketing, customer sensitivity to product measurement program, and game/contest/entertainment device.

The preferred method for providing an incentive for a viewer to watch network programming includes prompting the viewer during a television programming stream to provide an indicated response to an event within an indicated time period, detecting the indicated response to the event, measuring a response time of the indicated response to the event, evaluating viewer performance based upon the response time, and providing the incentive to the viewer based upon the response time.

The event may comprise one or more intentional or incidental occurrences of audio/visual content broadcast to the viewer during the television programming stream. The indicated response to the event may be time-stamped and used to create a viewer's action log from the indicated response and the response time, which may be compared against any known sequence of events.

In one embodiment, the indicated response to the event is provided by the viewer actuating a pushbutton key on a set-top box remote control unit which transmits an encoded signal when the viewer identifies the one or more intentional or incidental occurrences of audio/visual content.

In one embodiment, the present invention provides a media delivery device for providing an incentive to a viewer to watch network programming. The media delivery device includes a decoder operable for decoding broadcast media programming into the media delivery device, a processor operable for generating incidental or intentional occurrences of audio/visual cues to be inserted into the media delivery device, a sensor operable for detecting viewer responses to the incidental or intentional occurrences of audio/visual cues, a processor operable for measuring the response time of the viewer's response, and a processor operable for evaluating the viewer's response by comparing the response time against any known sequence of events, the results of which are used to provide an incentive to the viewer based upon the evaluation.

In a further embodiment, the media delivery device includes a network connection operable for transmitting encoded signals between the media delivery device and an external network, and wherein the media delivery device receives prompts from the external network and the external network receives notification for the viewer's response and the response time.

Additional objects, advantages, and novel features of the invention will be set forth in part in the description which follows, and in part will become more apparent to those skilled in the art upon examination of the following, or may be learned by practice of the invention.

DETAILED DESCRIPTION OF THE INVENTION

As required, detailed embodiments of the present invention are disclosed herein, however, it is to be understood that the disclosed embodiments are merely exemplary of the invention that may be embodied in various and alternative forms. Specific structural and functional details disclosed herein are not to be interpreted as limiting, but merely as a basis for the claims as a representative basis for teaching one skilled in the art to variously employ the present invention. Conventional hardware and systems are shown in block diagram form and process steps are shown in flowcharts.

Figure 1:
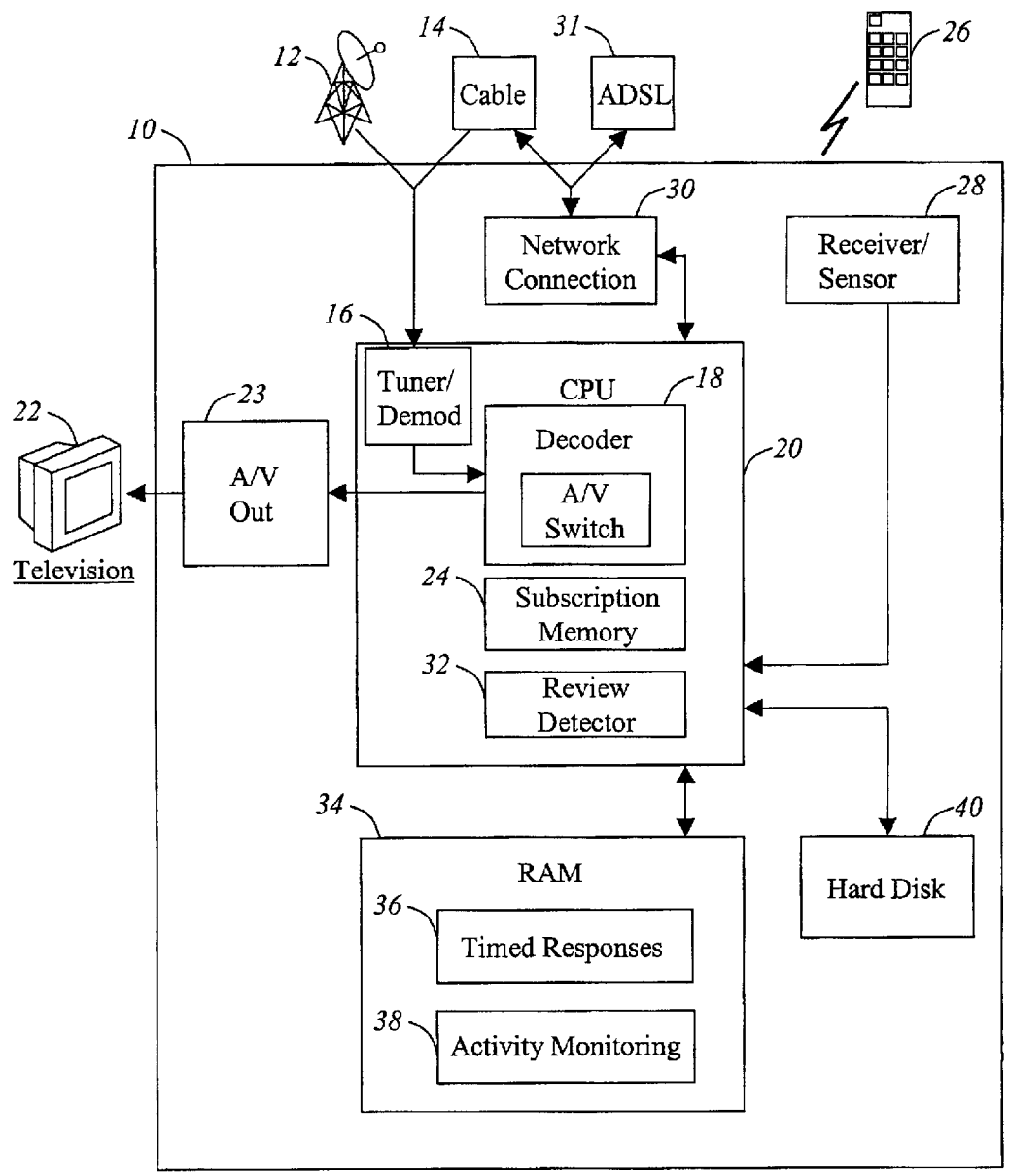
FIG. 1 is a exemplary schematic diagram of a set top box according to a preferred embodiment of the present invention.

Referring now to the drawings, in which like numerals indicate like elements throughout the several figures, FIG. 1 illustrates an exemplary hardware environment in which a conventional set top box (STB) 10, such as a set top box operable for monitoring viewing habits and collecting information, receives encoded television signals either from a satellite receiver 12 or a cable feed line 14, which is fed to a tuner/demodulator 16 for receiving digital signals. The STB 10 may be similar to the STB described in U.S. application Ser. No. 09/496825, filed Feb. 1, 2000, which is incorporated herein by reference. The digital signals are divided into audio and video (A/V) signals. The tuner/demodulator 16 tunes to the frequency of a broadcast stream that is selected by a viewer. The tuner/demodulator 16 feeds into a decoder 18 in a central processing unit (CPU) 20 in the set top box 10. The tuner 16 tunes to the frequency of a selected decoder 18 transport stream which is then decoded and fed to the television 22 via A/V out jacks 23.

Programming subscription memory 24 in the CPU 20 maintains a list of television stations that are available to the viewer in accordance with the subscription plan arranged by the user of the STB 10. In order to select a channel, the CPU 20 either receives signals from a user input device, such as a remote control unit 26 via a remote control sensor 28, or receives signals from the television unit 22. The STB 10 includes a control interface for accepting viewer commands from the remote control unit 22.

The STB 10 includes a network connection/modem 30 by which the set top box 10 may transmit and receive data from the cable or satellite television system provider. The network connection modem 30 may include an asymmetric digital subscriber line (ADSL) 31 modem or a cable modem. In conventional satellite television systems, the STB 10 initiates a call to the satellite system service provider in order to provide billing information, such as movie purchases.

The STB 10 additionally includes a television review detector 32. The detector 32 receives responses from a television viewer that is using the interactive two-way communication method of the present invention, as will be described below, via the remote control unit 26 and the remote control sensor 28. A random access memory module (RAM) 34 is operable for storing files and includes a timed response monitoring module 36, which time stamps a viewer's indicated response, and a viewer action's monitoring module 38, which monitors the viewer's indicated responses. The RAM module 34, timed-response monitoring module 36, and viewer action's monitoring module 38 are accessed by the CPU 20 during the operation of the two-way communication method of the present invention. Memory intensive files may be stored in a hard disk 40.

Persons skilled in the art will recognize that the present invention may be used with any of a variety of interactive media delivery systems, standard or wireless cable television systems, satellite television systems, or other media delivery systems that allow duplex communication (perhaps with the return path via a separate (e.g. telephone) network) to the STB 10 coupled to the viewer's television set 22 or the like. The present invention may be used in conjunction with additional demographics and programming ratings collection systems that may be deployed for use on an interactive media delivery system.

The CPU 20 in the STB 10 collects information to create a log relating to all or selected events of interest. An event is defined as an action or a change in the state of the STB 10 that is deemed important to building a knowledge base on particular viewers, their viewing patterns, and viewer response behavior. The CPU 20 records response times to audio/visual cues or events provided by the viewer through the actuation of a key on a user input device, such as a remote control unit 26. Viewer response times are then processed and evaluated for the purposes of competition, discounts, incentives, awards, and other purposes.

Broadly stated, the embodiment of the present invention shown in FIG. 1 builds upon the ability of the STB processor 18 to record the actions of a viewer while watching television. By actuating a key on a remote control unit 26 based upon audio/visual cues, viewer behavior may be recorded, transmitted if necessary, and then processed in order to evaluate the viewer behavior. Since each viewer action is time-stamped, a recreation of the viewer action sequence in time may be generated, which may be compared against any known sequence of events.

In the preferred embodiment, a television programming stream (network show, advertisement, etc.) presented over a particular period of time may include one or more intentional or incidental occurrences of audio/video content or events, such as the display of products, a word, a sound, an action by an actor, an effect, or any other recognizable event. Responses to these cues may be used as part of an award, incentive, measurement, market test, individual skill (including visual) measurement, marketing, customer sensitivity to product measurement program, competition, contest, and entertainment device.

Figure 2:
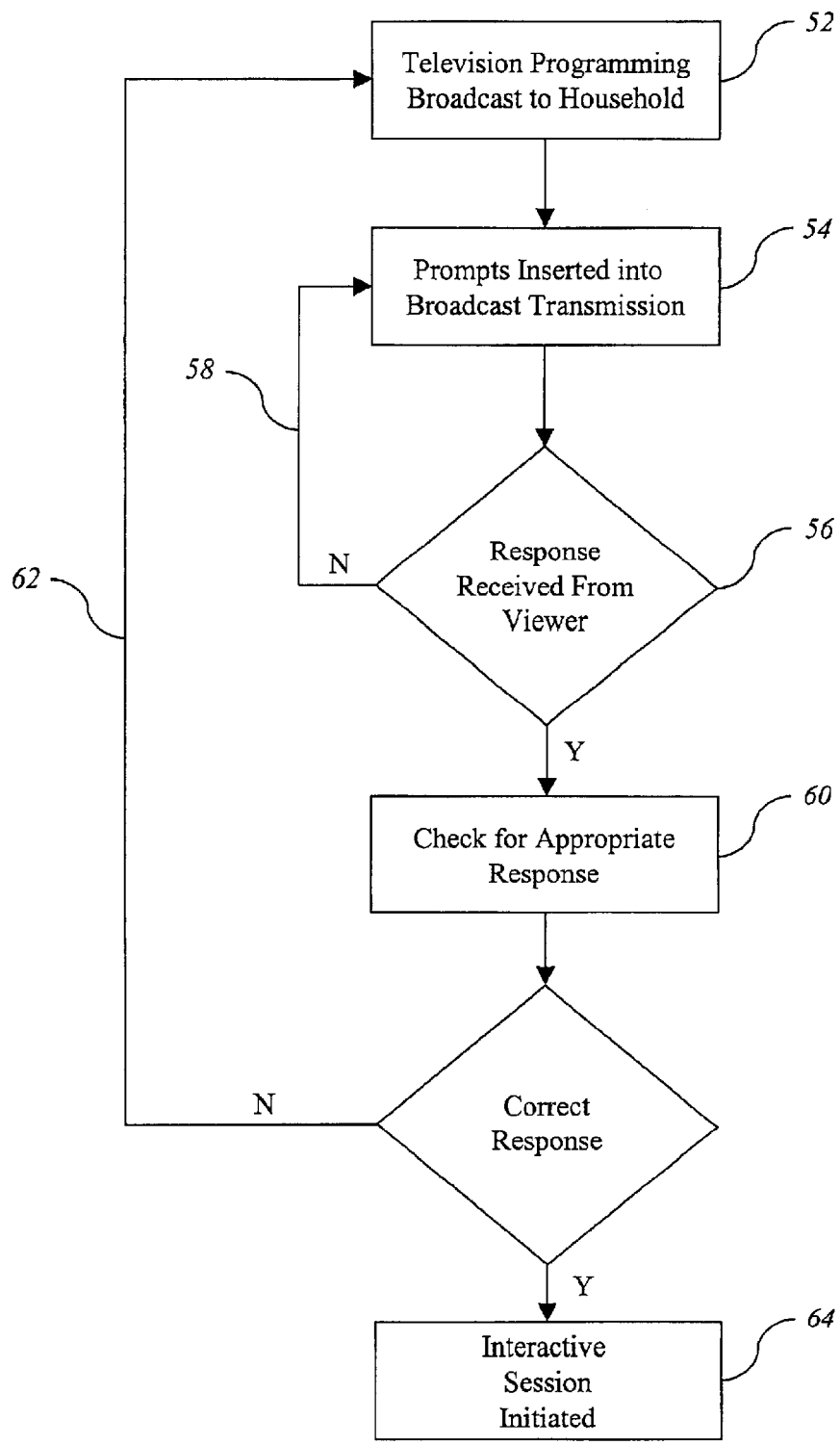
FIG. 2 is a flow diagram for prompting a viewer during a television broadcast and recording viewer response times using the set top box of FIG. 1 according to the preferred embodiment of the present invention.

FIG. 2 is a flowchart illustrating the steps involved in collecting and analyzing event data and delivering incentives, and the like, for the interactive session model, according to a preferred embodiment of the present invention. While the steps described herein and illustrated in the flowchart contain many specific examples of information, these steps should not be construed as limitations on the scope of the invention, but rather as examples of steps that could be used to practice the invention.

In step 52, a new interactive session may begin when a television broadcast is transmitted to a television set 22 through the STB 10. As described in FIG. 1, the viewer may access television stations included in the viewer's programming subscription via a user input device, such as a remote control unit 26 via a remote control sensor 28. The viewer's remote control unit 26 may include a dedicated "interactive session" pushbutton, or the viewer may actuate one or a series of pushbuttons in response to a prompt that is displayed on the television set 22, STB 10, or broadcast as an audio signal. Although there may be one or more dedicated pushbuttons on the remote control unit 26 for responding to prompts, the interactive system may utilize remote control unit 26 pushbuttons for multiple purposes.

The viewer may also be required to identify himself/herself using a personal identifier, such as a personal identification number (PIN). The personal identifier may be used to distinguish between different members of a household. In an alternative embodiment, the interactive system may be configured to automatically begin or continue a previously initiated session each time the television set 22 is turned on.

To initiate an interactive session, instruction signals or prompts may pre-exist in the content stream or may be inserted into the content stream by the CPU (20, FIG. 1) at step 54, and are provided to the viewer through any of the methods described above. The CPU 20 acts upon the incoming content stream from the tuner/demodulator (16, FIG. 1) and decode (18, FIG. 1) and may superimpose any new audio/video cues upon that stream. The STB 10 may provide a display that prompts the viewer to actuate one or a series of pushbuttons on the viewer's remote control unit 26 at specific times during the broadcast transmission. An example of a display prompt may include such visual cues as "start" displayed in the corner of the television 22 screen, an audible beep or word, or the appearance of a product within a subject program.

In step 56, the STB 10 of FIG. 1 detects if a response to an instruction or prompt is received through the infrared (IR) sensor (28, FIG. 1) of the STB 10 and the television review detector (32, FIG. 1). In step 58, if there is no response received from the viewer, a second prompt may be inserted into the broadcast transmission. The second prompt may be inserted after a predetermined time period, a minute for example, in order alert the viewer to the interactive session in case the viewer missed the first prompt. In one embodiment, additional prompts may be inserted into the broadcast transmission at various time intervals, such as every fifteen minutes, every half-an-hour, or every hour, for the purpose of informing the viewer that an interactive session may be initiated.

In step 60, after it has been detected that a response has been received from step 56, the system checks whether the viewer has entered an appropriate response to a prompt. The particular configuration of the system depends upon whether the prompt is generally located in the STB 10 or broadcast by the network. For example, if the prompt is generated by the CPU 20 of the STB 10, then the response activity monitor 38 detects whether the viewer responds within a certain number of seconds after the prompt is generated. However, if the prompt is broadcast by the television network, then the response activity monitor 38 may periodically download codes and acceptable response timing information via the network connection 30 from the television network. In such case, the STB 10 maintains a database of remote controller codes and corresponding time periods when the codes are to be transmitted by a viewer.

If a viewer response is not received in the STB 10, the system in step 62 continues the broadcasting of the television programming in step 50 in the normal fashion. However, in step 64, if the viewer provides an appropriate response within the proper time then an interactive session has been initiated, the details of which are discussed below.

Figure 3:
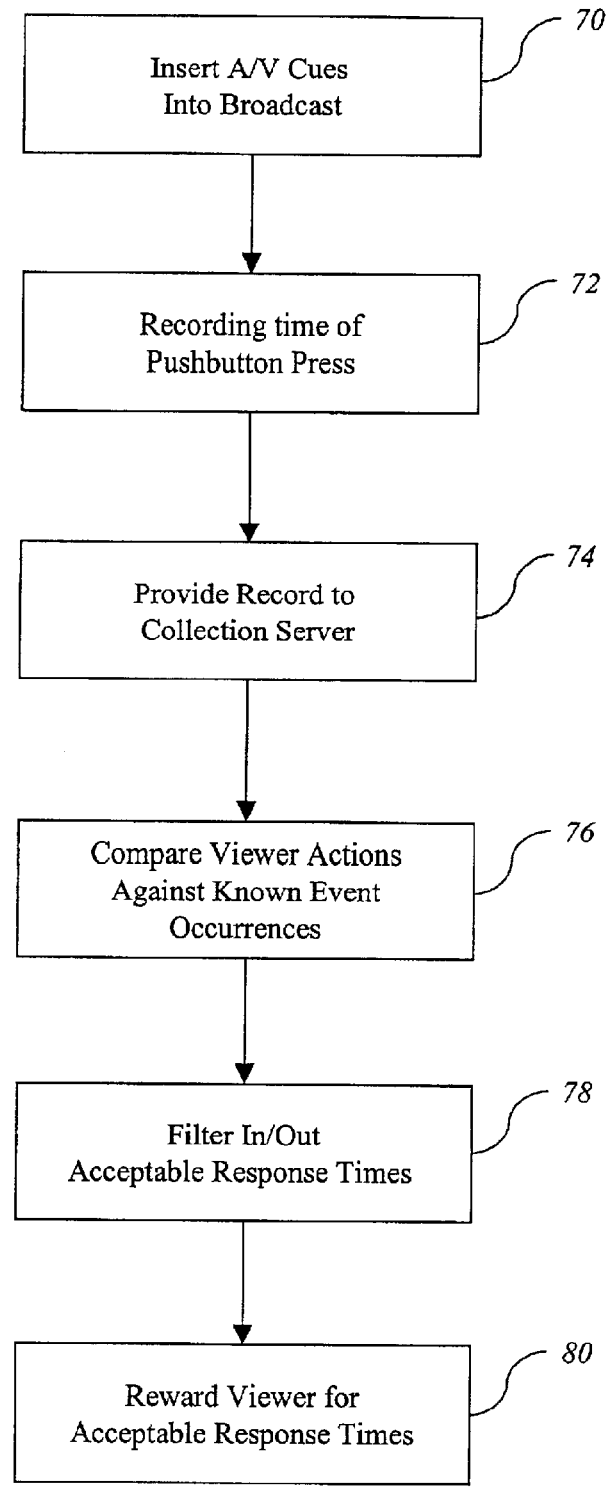
FIG. 3 is a flow diagram for providing rewards and incentives to a viewer who responds in an appropriate manner to one or more audio/visual cues using the set top box of FIG. 1.

FIG. 3 is a flow diagram illustrating an interactive session in which rewards and incentives may be provided to a viewer who responds in an appropriate manner to one or more audio/visual cues using the set top box of FIG. 1. At step 70, once an interactive session has been initiated by a viewer (step 64, FIG. 2), one or more audio/visual (A/V) cues are inserted into the television broadcast stream. The television broadcast stream (network show, advertisement, etc.) presented over a particular period of time may include one or more intentional or incidental occurrences of A/V content or events, such as the display of products, words, sounds, actions by an actor, effects, or any other recognizable event. The A/V cues may be presented for the purpose of obtaining and receiving information, incentives, awards, measurements, marketing information, viewer skill measurements, customer interests, and contests.

At step 72, the STB 10 records when a pushbutton is actuated and the time at which the press was performed. At step 74, the STB 10, when appropriate, provides the pushbutton time record of viewer actions to a collection server at the data-center/head-end of the operator of the interactive system (e.g. cable operator, direct-to-home satellite video operator, advertiser, etc.). The record of viewer actions may then be compared at the data-center against a known sequence of event occurrences provided by the content programmer, in step 76. The known sequence of events occurrences may be provided as a time/event listing that may be stored as an electronic database file. The comparison may be done to determine which known events were detected by the viewer and the latency associated with the viewer's actuation of the designated pushbutton. At step 78, the latency between event presentation and viewer action may, if desired, be used to filter in/out acceptable response times for various purposes.

Given that viewer identity is known based upon viewer identification, as described above, at step 80 the viewer may be rewarded or otherwise recognized for their diligent viewing of the presentation and appropriate time responses to A/V cues. The interactive system may retrieve the viewer's account information and display a description of the awards that are available to that viewer based upon the viewer's response times and number of correct responses.

In one embodiment, the STB 10 connects to and sends viewer identification information and response data to an external network via the network connection 30 described above. The operation of the external network may be sponsored by the cable television provider or the digital satellite network. Alternatively, the external network may be operated by a separate market research company affiliated with the cable television provider or the digital satellite network. As another option to increase the effectiveness of the interactive system with regards to advertising, a viewer's time response data may be transmitted through the STB 10 directly to a vendor. For example, if a viewer presses the remote control key within an appropriate amount of time when a well known beverage can is displayed in a movie, the vendor may then directly provide the viewer with an award, such as a coupon for the beverage received in the mail. In that case, the STB 10 transmits a signal through the network connection 30 to indicate that the viewer is to receive a coupon. The signal may include a viewer identification number, the date at which the interactive session took place, the response times of the viewer, and the particular product or service being presented to the viewer.

The methods and systems of the present invention may be used to sponsor various viewing incentive activities, such as activities and competitions for individual and multiple viewers to note and respond to events, whereby viewers with the either individually or comparatively highest score based on events noted and response times may receive special awards, prizes, discounts on products, etc. A/V cues may be sent at the beginning of a program and may include may include examples such as "Find the 15 times that a widget is displayed during this movie and receive a $1 discount coupon for a widget purchase", "The three highest scores noting each time an advantage of the new widget is mentioned will receive a free one", and scoring a boxing match along with the judges. Given that there are multiple pushbuttons on a remote control unit 26, it is possible for multiple events to be tracked, recorded, and evaluated simultaneously.

Viewer response time data may be sent through the STB 10 to the data-center for the purpose of confirming, in creative ways, that the viewer is experiencing a program. Viewers may generate an additional interest in a program if they are rewarded for participating.

Additional uses of the present systems and methods may include evaluating viewer response times for marketing purposes, such as the number of viewers participating in events, viewer performance, and incentives awarded. These marketing tools may provide advertisers and content managers with data which may lead to product placements in programming and viewer awareness of products within a television program including product sensitivity. In addition, appropriate responses and response times may be evaluated to measure individual viewer skills, such as visual and audio skill measurements. For example, visual tracking problems may be tested, evaluated, and trained. In another example, audio pitch skills may be broadcast and tested. A musical note may be broadcast and a response given identifying the note, such as the difference between an "A" and a "C". Skills testing may be accomplished based upon response times The present invention may be enabled for positive instant-feedback to the viewer or delayed feedback to the viewer. In a STB 10 without substantial internal processing, logic, and extra programming associated with it, the interactive system of the present invention may be restricted to a delayed-type feedback system in which the post processing of viewer reactions take place. In this type of system, viewer actions and response times may be sent to through the STB 10 to a data-center where they are processed. Processing may include determining whether or not response times match up correctly or adequately relative to other individuals or a known set of events. A response may then be provided back to the user via email, the telephone, or U.S. mail.

In a positive instant-feedback system in which a STB 10 is capable of more substantial logic and processing, the system may provide instant feedback to a viewer. For example, if a viewer respond to a specific A/V cue in an appropriate amount of time, the STB 10 may temporarily display an A/V cue back to the viewer, such as a checkmark or a thumbs-up symbol displayed in the corner of the television set 22 display. In a further embodiment, a rolling tally may be displayed which provides the viewer with a score, the score being based upon correct responses and response times. Data item/tags may be placed within an A/V stream at specific time points. These tags may be inserted by the program provider and indicate that an event item is being presented at a certain time within a show. The tag may also indicate the time within which a response is required as well as the specific remote control unit 26 button to be actuated. A STB 10 equipped to detect the in-stream tags may then monitor an action by the viewer which, if detected, may generate an audio or visual feedback indicating whether the viewer response has occurred within the timeframe required and perhaps if the correct pushbutton has been actuated.

To illustrate the present invention in a real-world example, assume that a viewer has chosen to watch a Sunday afternoon football game. As a subscriber of television programming utilizing the present invention, the viewer is shown a prompt at the very beginning of the game. The prompt is displayed as a visual message appearing in the corner of the television set 22 display. The prompt is inserted into the broadcast transmission by the CPU 20. The prompt may read, for example, "Click on your remote control every time the camera pans to the Gatorade™ cooler on the sidelines. Identify it within five seconds three times in a row and receive $1 off your next purchase."

The viewer may opt to participate in the session by actuating a pushbutton on the remote control unit 26, or may opt not to proceed and actuate a cancel button on the remote control unit 26. When a viewer opts not to participate, all prompts will be discontinued to that viewer for a certain period of time, perhaps until the next show, or in another example, not until the next time that the viewer turns on the television set 22.

Assume for the purposes of this example that the viewer decides to participate in the interactive session. The football game begins and the first time that the Gatorade™ cooler appears the viewer actuates a pushbutton on the remote control unit 26 within five seconds of the appearance of the cooler. The remote sensor 28 sends an encoded message to the STB 10 where the CPU 20 time stamps the indicated response and sends it to a data-center via the network connection 30, where the timed response meets the requirements of the known sequence of events. The viewer then responds within five seconds to a second and third appearance of the cooler within the five second time designation. At this point, the viewer has fulfilled the requirements of the session and now qualifies to receive the coupon. The coupon may be sent via the U.S. Postal Service or via email, where it may be printed by the viewer.

To illustrate the use of the present invention in a second real-world example, assume that an advertiser desires to collect information relating to the placement of the advertiser's product within a movie. Assume that BMW™ has paid to have one of their automobiles used in a new action movie. The star of the movie drives the car in six different scenes, and in those six scenes the BMW™ emblem is shown. To collect information relating to the effectiveness of the placement of the automobile, the advertiser may employ the present invention.

Viewers subscribing to the interactive media service of the present invention are prompted at the beginning of the movie by the media delivery service of the details of the session. To initiate a session, a viewer accepts the session by actuating a pushbutton on their remote control unit 26 which includes a sensor 28 that sends an encoded signal to the STB 10. Each time that the automobile appears, each time being a visual cue, the viewer actuates a pushbutton on their remote control unit 26. The STB 10 receives an encoded signal from the remote control unit 26 and time stamps the response and sends it to a data center via the network connection 30. In another example, the STB 10 collects each viewer response, time stamps it, and then transmits all of the time-stamped viewer actions to the data center at the conclusion of the movie.

The advertiser may then compare viewer actions to the known sequence of automobile occurrences in order to determine the effectiveness of product placement. The comparison information may be used as a marketing tool and for future product placement decisions. A viewer response log may be sent to each viewer detailing their performance.

The foregoing is provided to explain and disclose preferred embodiments of the present invention, modifications to which may be made that still fall within the following claims. Further modifications and adaptations to the described embodiments will be apparent to those skilled in the art and may be made without departing from the scope or spirit of the invention and the following claims.

What is claimed is:

1. A method for evaluating the performance of a viewer watching a television programming stream, comprising the steps of:

receiving a broadcast of the television programming stream, the television programming stream comprising a televised broadcast transmission of at least one of a live media session and a recorded media session;

inserting an audio/video cue into the television programming stream, the audio/video cue associated with content of the television programming stream such that the audio/video cue prompts the viewer during presentment of the television programming stream to provide an indicated response to an event within an indicated time period;

presenting the television programming stream and the audio/visual cue to a media delivery system device; and if the viewer responds to the cue within the indicated time period, then:
  detecting the indicated response to the event,
  measuring a response time of the indicated response to the event, wherein the response time is the time between the time which event occurred and when the viewer provided the indicated response,
  evaluating viewer performance based upon the response time such that the response time associated with the viewer is compared to one of another response time to another event and an averaged response time of two or more other events, and
  providing an incentive to the viewer based upon the viewer's performance.

2. The method of claim 1, wherein the event comprises an occurrence of audio/visual content broadcast to the viewer during the television programming stream.

3. The method of claim 1, further comprising time-stamping the indicated response to the event.

4. The method of claim 1, further comprising creating a viewer action's log from the indicated response and the response time.

5. The method of claim 4, further comprising comparing the viewer's action log to a known sequence of events.

6. The method of claim 1, wherein the television programming stream comprises an advertisement.

7. The method of claim 1, wherein the indicated response to the event is provided by the viewer actuating a pushbutton key on a set-top box remote control unit which transmits an encoded signal to a set top box, when the viewer identifies the occurrence of audio/visual content.

8. The method of claim 7, wherein the set-top box is operable for monitoring viewing habits and actions, collecting information, and receiving encoded television signals.

9. The method of claim 1, wherein the incentive comprises at least one of: an award, a coupon, a discount, and a prize.

10. The method of claim 1, further comprising transmitting the indicated response and the response time to a data-center.

11. The method of claim 1, wherein the evaluating performance step comprises instant feedback to the viewer.

12. The method of claim 1, further comprising the step of:
if the viewer does not respond to the cue within the indicated time period, then:
  discontinuing presentment of the cue during the television programming stream, and
  continuing presentment of the broadcast of the television programming stream without a subsequent audio/visual cue.

13. A media delivery device for evaluating a viewer watching programming, comprising:
a decoder operable for decoding broadcast media programming into the media delivery device, wherein the broadcast media programming comprises a broadcast of a television programming stream and an occurrence of an audio/visual cue, the television programming stream comprising a televised transmission of at least one of a live media session and a recorded media session;

a viewer's action module operable for detecting a viewer's response to the occurrence of the audio/visual cues;
a timed response monitoring module operable for:
  measuring a response time of the viewer's response to the event, wherein the response time is the time between the time which event occurred and when the viewer provided the indicated response, and
  evaluating viewer performance based upon the response time such that the response time associated with the viewer is compared to one of another response time to another event and an averaged response time of two or more other events; and
a processor operable for evaluating the viewer's response and the response time by comparing the viewer's response and the response time against any known sequence of events, wherein an incentive is provided to the viewer based upon the viewer s response and the response time.

14. The device of claim 13, further comprising:
a network connection operable for transmitting encoded signals between the media delivery device and an external network;
wherein the media delivery receives prompts from the external network, and the external network receives notification for the viewer's response and the response time.

15. The device of claim 13, wherein the media programming comprises an advertisement.

16. The device of claim 13, wherein the viewer's response to the occurrence of audio/visual cues is provided by the viewer actuating a pushbutton key on a set-top box remote control unit which transmits an encoded signal when the viewer identifies the occurrence of audio/visual cues.

17. The device of claim 16, wherein the set-top box is operable for monitoring viewing habits and actions, collecting information, and receiving encoded television signals.

18. The device of claim 13, the processor further operable for disabling presentment of a subsequent audio/visual cue if the viewer does not respond to the audio/visual cue within a selected time period such that the broadcast of the television programming stream continues uninterrupted without a subsequent audio/visual cue.

19. A method, comprising the steps of:
receiving a broadcast of an interactive media content stream, the interactive media content stream having a television programming stream comprising a televised broadcast transmission of at least one of a live media session and a recorded media session and the interactive media content stream further having an audio/video cue associated with content of the television programming stream such that the audio/video cue prompts the viewer during presentment of the television programming stream to provide an indicated response to an event within an indicated time period;
presenting the interactive media content stream to a media delivery system device;
if the viewer responds to the cue within the indicated time period, then:
  detecting the indicated response to the event,
  measuring a response time of the indicated response to the event, wherein the response time is the time between the time which event occurred and when the viewer provided the indicated response,
  evaluating viewer performance based upon the response time such that the response time associated with the viewer is compared to one of another response time to another event and an averaged response time of two or more other events, and providing an incentive to the viewer based upon the viewer's performance.

20. The method of claim 19, further comprising the step of:

if the viewer does not respond to the cue within the indicated time period, then:

discontinuing presentment of the cue during the television programming stream, and continuing presentment of the broadcast of the television programming stream without presentment of a subsequent audio/visual cue.

* * * * *